US010903872B2

(12) United States Patent
Sun et al.

(10) Patent No.: US 10,903,872 B2
(45) Date of Patent: Jan. 26, 2021

(54) DEVICE-TO-DEVICE COMMUNICATION METHOD AND TERMINAL DEVICE

(71) Applicant: HUAWEI TECHNOLOGIES CO., LTD., Guangdong (CN)

(72) Inventors: Yinghua Sun, Shenzhen (CN); Xingwei Zhang, Beijing (CN); Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/266,958

(22) Filed: Feb. 4, 2019

(65) Prior Publication Data
US 2019/0173522 A1 Jun. 6, 2019

Related U.S. Application Data

(63) Continuation of application No. PCT/CN2016/094025, filed on Aug. 8, 2016.

(51) Int. Cl.
*H04B 1/7143* (2011.01)
*H04W 72/04* (2009.01)
(Continued)

(52) U.S. Cl.
CPC ......... *H04B 1/7143* (2013.01); *H04B 1/7156* (2013.01); *H04L 5/0005* (2013.01);
(Continued)

(58) Field of Classification Search
CPC .............. H04L 5/0023; H04L 5/0094; H04W 72/0446; H04W 72/0453; H04W 72/1273; H04B 1/7143
(Continued)

(56) References Cited

U.S. PATENT DOCUMENTS

2016/0269887 A1 9/2016 Kim et al.
2017/0013628 A1 1/2017 Kim et al.
(Continued)

FOREIGN PATENT DOCUMENTS

CN 101841776 A 9/2010
CN 104754627 A 7/2015
(Continued)

OTHER PUBLICATIONS

Partial Supplementary European Search Report issued in European Application No. 16911955.9 dated May 15, 2019, 14 pages.
(Continued)

*Primary Examiner* — Leila Malek
(74) *Attorney, Agent, or Firm* — Fish & Richardson P.C.

(57) ABSTRACT

Embodiments of the present disclosure include example device-to-device communication methods and terminal devices. One example method includes determining, by a terminal device, a first resource, where the first resource is some time-frequency resources in a first resource set, where the first resource set is all time-frequency resources that can be used to detect a first transmission resource. The first transmission resource is a spectrum resource used to transmit first data. The terminal device can then perform detection for the first transmission resource in the first resource. In some instances, the terminal device can then send first data on the first transmission resource.

16 Claims, 7 Drawing Sheets

A terminal device determines a first resource, where the first resource is some time-frequency resources in a first resource set, the first resource set is all time-frequency resources usable for detection of a first transmission resource, and the first transmission resource is a spectrum resource used to transmit first data ~ 210

The terminal device performs detection for the first transmission resource in the first resource ~ 220

(51) Int. Cl.

| | | |
|---|---|---|
| *H04W 52/02* | (2009.01) | |
| *H04L 5/00* | (2006.01) | |
| *H04W 4/70* | (2018.01) | |
| *H04W 76/14* | (2018.01) | |
| *H04B 1/7156* | (2011.01) | |
| *H04W 74/08* | (2009.01) | |
| *H04W 92/18* | (2009.01) | |

(52) U.S. Cl.
CPC ............. *H04L 5/0094* (2013.01); *H04W 4/70* (2018.02); *H04W 52/02* (2013.01); *H04W 72/04* (2013.01); *H04W 74/0841* (2013.01); *H04W 76/14* (2018.02); *H04L 5/0007* (2013.01); *H04W 92/18* (2013.01); *Y02D 30/70* (2020.08)

(58) Field of Classification Search
USPC ........................................................ 375/132
See application file for complete search history.

(56) References Cited

U.S. PATENT DOCUMENTS

| | | | |
|---|---|---|---|
| 2017/0079069 A1 | 3/2017 | Wang et al. | |
| 2017/0156134 A1* | 6/2017 | Zhao | H04W 72/0406 |
| 2017/0230959 A1* | 8/2017 | Wu | H04W 72/02 |

FOREIGN PATENT DOCUMENTS

| | | |
|---|---|---|
| CN | 105101300 A | 11/2015 |
| EP | 3110052 A1 | 12/2016 |
| KR | 20140129503 A | 11/2014 |
| WO | 2015065113 A1 | 5/2015 |
| WO | 2015126115 A1 | 8/2015 |
| WO | 2015200607 A1 | 12/2015 |
| WO | 2016019864 A1 | 2/2016 |
| WO | 2016045443 A1 | 3/2016 |
| WO | 2017170775 A1 | 10/2017 |

OTHER PUBLICATIONS

3GPP TS 36.213 V13.1.0 (Jun. 2016), 3rd Generation Partnership Project;Technical Specification Group Radio Access Network;Evolved Universal Terrestrial Radio Access (E-UTRA);Physical layer procedures(Release 13), 381 pages.

3GPP TS 36.321 V13.2.0 (Jun. 2016), 3rd Generation Partnership Project;Technical Specification Group Radio Access Network;Evolved Universal Terrestrial Radio Access (E-UTRA);Medium Access Control (MAC) protocol specification (Release 13), 91 pages.

International Search Report and Written Opinion issued in International Application No. PCT/CN2016/094025 dated Apr. 27, 2017, 15 pages.

Office Action issued in Japanese Application No. 2019-506667 dated Jan. 21, 2020, 10 pages (with English translation).

Office Action issued in Chinese Application No. 201680088270.X dated Mar. 4, 2020, 7 pages.

NTT Docomo, Inc., "Further detail of partial sensing for P2V operation," 3GPP TSG RAN WG1 #85, R1-165208, Nanjing, China, May 23-27, 2016, 3 pages.

Office Action issued in Korean Application No. 2019-7005755 dated May 15, 2020, 12 pages (with English translation).

NTT Docomo, Inc., "Evaluation of PC5 transport for V2P/V2I/I2V communications," 3GPP TSG RAN WG1 Meeting #85, R1-165207, Nanjing, China, May 23-27, 2016, 5 pages.

Office Action issued in Korean Application No. 2019-7005755 dated Nov. 30, 2020, 5 pages (with English translation).

\* cited by examiner

DEVICE-TO-DEVICE COMMUNICATION METHOD AND TERMINAL DEVICE

CROSS-REFERENCE TO RELATED APPLICATIONS

This application is a continuation of International Application No. PCT/CN2016/094025, filed on Aug. 8, 2016, the disclosure of which is hereby incorporated by reference in its entirety.

TECHNICAL FIELD

Embodiments of the present invention relate to the field of wireless communications, and more specifically, to a device-to-device communication method and a terminal device.

BACKGROUND

As Long Term Evolution (Long Term Evolution, "LTE" for short) communications technologies develop continuously, load of a cellular network is becoming increasingly heavy, and existing spectrum resources are becoming increasingly strained. Because most current mobile devices use various wireless technologies such as Bluetooth or Wireless Fidelity (Wireless Fidelity, "WiFi" for short), operators providing these technologies have come to realize that direct communication between mobile devices is to become hot in the future. This is accompanied by arising of direct device-to-device (Device to Device "D2D" for short) communication. The arising of D2D resolves problems such as insufficient frequency spectrums and excessively heavy network load to a great extent. In this mode of direct communication between devices, one device may communicate with another device directly without forwarding of a base station. This offloads data traffic of the base station. D2D communication can make better use of spectrum resources to increase spectral utilization and data rates and relieve load of a base station.

Resource allocation technologies for device-to-device communication may include a random resource selection technology and a resource sensing technology. When resources are allocated by using the resource sensing technology, a terminal device needs to sense resources in a fixed-size segment of a resource set in a resource pool. After sensing the resources in the resource set, the terminal device selects a proper resource to send to-be-transmitted data. If resource sensing is performed in the entire resource set, power consumption of the terminal device is very high. Therefore, how to reduce power consumption of a terminal device in a communication process is one of key challenges that require a solution.

SUMMARY

In view of this, embodiments of the present invention provide a device-to-device communication method and a terminal device, to reduce power consumption of a terminal device in a communication process.

According to a first aspect, a device-to-device communication method is provided, including:
determining, by a terminal device, a first resource, where the first resource is some time-frequency resources in a first resource set, the first resource set is all time-frequency resources that can be used to detect a first transmission resource, and the first transmission resource is a spectrum resource used to transmit first data; performing, by the terminal device, detection for the first transmission resource in the first resource; and sending, by the terminal device, the first data on the first transmission resource.

Detection for a transmission resource used to transmit data is performed on some time-frequency resources in an original resource set used for detection of a transmission resource in the prior art. Therefore, power consumption of the terminal device is reduced in a device-to-device communication process.

In another embodiment, the determining, by a terminal device, a first resource includes:
determining, by the terminal device, a target numerical value from a plurality of numerical values, where the target numerical value is used to indicate a time-domain location of the first resource in the first resource set; and determining, by the terminal device, the first resource based on the target numerical value.

It should be understood that these numerical values may be some random "seeds" configured by a network device, and the terminal device performs random selection from these random seeds. Alternatively, for these predefined numerical values, a network device may configure different numerical values for different terminal devices, for example, configuring different numerical values for different types of terminal devices, so that when terminal devices of types such as P-UE and V-UE perform resource detection, the detection operations are kept from being performed in a same time period to reduce resource collision. Alternatively, different types of data correspond to different numerical values. Alternatively, a network device configures different target numerical values for terminal devices located in different cells. This is not limited herein.

In another embodiment, before the determining, by the terminal device, the first resource based on the target numerical value, the method further includes:
receiving, by the terminal device, information about the plurality of numerical values that is sent by a network device.

For example, the network device may determine, based on information such as a quantity of terminal devices within a coverage area of the network device, coverage statuses of the terminal devices, information about a key frequency band in a carrier, and a type of a currently active service or a type of data being transmitted currently, a plurality of numerical values for selection by the terminal devices; and send information about these numerical values to the terminal devices. For example, the network device may send configuration information including the information about these numerical values in a broadcast manner, or the network device may update configuration information including the information about the plurality of numerical values based on current network usage.

In another embodiment, the determining, by a terminal device, a first resource includes:
determining, by the terminal device, a target frequency hopping pattern from a plurality of frequency hopping patterns, where the target frequency hopping pattern indicates a time-frequency resource used for a frequency hopping operation; and determining, by the terminal device, the time-frequency resource used for a frequency hopping operation that is indicated by the target frequency hopping pattern, as the first resource.

The time-frequency resource used for a frequency hopping operation that is indicated by the target frequency hopping pattern may include a plurality of unit time-frequency resources. The terminal device performs detection, based on locations of the plurality of unit time-frequency resources indicated by the target frequency hopping pattern, for the first transmission resource used to transmit the first data in the plurality of unit time-frequency resources. The locations of the plurality of unit time-frequency resources may be adjacent, or may not be adjacent, and sizes of all the unit time-frequency resources may be the same, or may be different. No limitation is imposed on a quantity of unit time-frequency resources herein.

In another embodiment, the time-frequency resource used for a frequency hopping operation that is indicated by the target frequency hopping pattern includes a plurality of unit time-frequency resources; and the performing, by the terminal device, detection for the first transmission resource in the first resource includes:

performing, by the terminal device, detection for the first transmission resource in the first resource based on a frequency hopping parameter of the target frequency hopping pattern, where the frequency hopping parameter includes at least one of the following: a time-domain interval between the plurality of unit time-frequency resources, a frequency-domain interval between the plurality of unit time-frequency resources, and a size of each of the plurality of unit time-frequency resources.

In another embodiment, before the determining, by the terminal device, a target frequency hopping pattern from a plurality of frequency hopping patterns, the method further includes:

receiving, by the terminal device, information about the plurality of frequency hopping patterns that is sent by a network device.

For example, the network device may determine, based on information such as a quantity of terminal devices within a coverage area of the network device, coverage statuses of the terminal devices, information about a key frequency band in a carrier, and a type of a currently active service or a type of data being transmitted currently, a plurality of frequency hopping patterns for selection by the terminal devices; and send configuration information including information about these frequency hopping patterns to the terminal devices.

The plurality of frequency hopping patterns may alternatively be a plurality of frequency hopping patterns agreed upon between the terminal device and the network device, for example, specified in a protocol, or existing frequency hopping patterns in device-to-device communication.

In another embodiment, if the terminal device fails to detect the first transmission resource in the first resource, the method further includes:

determining, by the terminal device, a second resource based on the first resource, where the second resource includes some time-frequency resources in the first resource set, and the second resource is different from the first resource; and performing, by the terminal device, detection for the first transmission resource in the second resource.

Some time-frequency resources in the first resource set that are used for one time of detection of the first transmission resource are correlated with those used for another time of detection. Therefore, the terminal device can autonomously perform detection, in the first resource set based on correlation between these time-frequency resources, for the first transmission resource for transmission of the first data, thereby reducing overheads of control signaling between the network device and the terminal device.

In another embodiment, the determining, by the terminal device, a second resource based on the first resource includes:

determining, by the terminal device, a time-domain interval between the second resource and the first resource based on the first resource; and/or determining, by the terminal device, a time-domain resource of the second resource based on the first resource; and/or determining, by the terminal device, a frequency-domain resource of the second resource based on the first resource.

In another embodiment, the determining, by the terminal device, a time-domain interval between the second resource and the first resource based on the first resource includes:

determining, by the terminal device, the time-domain interval between the second resource and the first resource based on at least one of the following types of information:

an energy value of at least one resource including the first resource, a resource usage of the at least one resource, a congestion or collision level of the at least one resource, and a time-domain interval between the at least one resource.

In another embodiment, the determining, by the terminal device, a time-domain resource of the second resource based on the first resource includes:

determining, by the terminal device, the time-domain resource of the second resource based on at least one of the following types of information:

an energy value of at least one resource including the first resource, a resource usage of the at least one resource, a congestion or collision level of the at least one resource, and a size of a time-domain resource of the at least one resource.

In another embodiment, the determining, by the terminal device, a frequency-domain resource of the second resource based on the first resource includes:

determining, by the terminal device, the frequency-domain resource of the second resource based on at least one of the following types of information:

an energy value of at least one resource including the first resource, a resource usage of the at least one resource, a congestion or collision level of the at least one resource, and a size of a frequency-domain resource of the at least one resource.

In another embodiment, the determining, by the terminal device, a second resource based on the first resource includes:

determining, by the terminal device, a size of a time-frequency resource of the second resource based on a size of a time-frequency resource of the first resource, where the size of the time-frequency resource of the second resource is greater than or equal to the size of the time-frequency resource of the first resource.

Optionally, the terminal device may determine, based on a size of the to-be-sent first data, a smallest resource granularity for detection of the first transmission resource, and then increase, step by step by using the smallest resource granularity as a unit, a size of a time-frequency resource area used for resource detection.

In another embodiment, if the terminal device fails to detect the first transmission resource in the first resource, the method further includes:

determining, by the terminal device, a third resource based on the first resource, where the third resource includes some time-frequency resources in a second resource set, the second resource set is all time-frequency resources that can be used to detect a second transmission resource, the second transmission resource is a spectrum resource used to transmit second data, and a relative location of the third resource in the second resource set is different from a relative location of the first resource in the first resource set; and performing, by the terminal device, detection for the second transmission resource in the third resource.

In another embodiment, if the terminal device successfully detects the first transmission resource in the first resource, the method further includes:

determining, by the terminal device, a fourth resource based on the first resource, where the fourth resource includes some time-frequency resources in a second resource set, the second resource set is all time-frequency resources that can be used to detect a second transmission resource, the second transmission resource is a spectrum resource used to transmit second data, and a relative location of the fourth resource in the second resource set is the same as a relative location of the first resource in the first resource set; and performing, by the terminal device, detection for the second transmission resource in the fourth resource.

A detection result obtained for detection of a transmission resource for sending of current data provides guidance for detection of a transmission resource used for sending of subsequent data. Therefore, a success rate of resource contention before subsequent data transmission is increased, and power consumption of the terminal device is reduced further.

In another embodiment, in the first resource set, if a quantity of resources used by the terminal device for detection of the first transmission resource exceeds a preset value, or a size of a time-domain resource used by the terminal device for detection of the first transmission resource exceeds a preset value, the terminal device stops detection for the first transmission resource in the first resource set.

In another embodiment, the method further includes:

determining, by the terminal device from the resources used for detection of the first transmission resource, a spectrum resource whose energy value is less than an energy threshold; and determining, by the terminal device from the spectrum resource whose energy value is less than the energy threshold, the first transmission resource used to transmit the first data.

In another embodiment, the method further includes:

determining, by the terminal device from the resources used for detection of the first transmission resource, a spectrum resource having a smallest energy value; and determining, by the terminal device, the spectrum resource having the smallest energy value as the first transmission resource used to transmit the first data.

In another embodiment, the method further includes:

determining, by the terminal device based on the resources used for detection of the first transmission resource, a spectrum resource that is in the first resource set and that is not covered by detection; and determining, by the terminal device from the spectrum resource that is not covered by detection, the first transmission resource used to transmit the first data.

In another embodiment, the terminal device includes a handheld terminal device, and when the handheld terminal device and another terminal device that is not the terminal device and that sends non-emergency data detect the first transmission resource simultaneously, a priority of the handheld terminal device is higher than a priority of the another terminal device.

Herein, because the priority of the handheld terminal device is higher than the priority of the another terminal device that sends non-emergency data, when a collision occurs during resource contention, reduction of power consumption of the handheld terminal device can be preferentially ensured.

According to a second aspect, a terminal device is provided, where the terminal device may be configured to perform the processes performed by the terminal device in the device-to-device communication method in any one of the first aspect and the implementations thereof. The terminal device includes:

a determining module, configured to determine a first resource, where the first resource is some time-frequency resources in a first resource set, the first resource set is all time-frequency resources that can be used to detect a first transmission resource, and the first transmission resource is a spectrum resource used to transmit first data; a detection module, configured to perform detection for the first transmission resource in the first resource determined by the determining module; and a sending module, configured to send the first data on the first transmission resource successfully detected by the detection module.

According to a third aspect, another terminal device is provided, including a processor, a receiver, a transmitter, and a memory, where the storage unit is configured to store an instruction, the processor is configured to execute the instruction stored in the memory, and execution of the instruction stored in the memory by the processor causes the processor to execute the method in any one of the first aspect and the possible implementations of the first aspect.

The processor is specifically configured to: determine a first resource, where the first resource is some time-frequency resources in a first resource set, the first resource set is all time-frequency resources that can be used to detect a first transmission resource, and the first transmission resource is a spectrum resource used to transmit first data; and perform detection for the first transmission resource in the first resource.

The transmitter is configured to send the first data on the first transmission resource.

According to a fourth aspect, a computer readable medium is provided, configured to store a computer program, where the computer program includes an instruction used to execute the method in any one of the first aspect and the possible implementations of the first aspect.

Based on the foregoing technical solutions, in the embodiments of the present invention, detection for a transmission resource used to transmit data is performed on some time-frequency resources in an original resource set used for detection of a transmission resource in the prior art. Therefore, power consumption of the terminal device is reduced in a device-to-device communication process, and resource collision between devices can also be reduced.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the technical solutions in the present invention may be applied to various communications systems, such as a Global System for Mobile Communications (Global System for Mobile Communications, "GSM" for short), a Code Division Multiple Access (Code Division Multiple Access, "CDMA" for short) system, a Wideband Code Division Multiple Access (Wideband Code Division Multiple Access Wireless, "WCDMA" for short) system, a General Packet Radio Service (General Packet Radio Service, "GPRS" for short) system, a Long Term Evolution (Long Term Evolution, "LTE" for short) system, a Long Term Evolution-Advanced (Long Term Evolution-Advanced, LTE-A for short) system, a Universal Mobile Telecommunications System (Universal Mobile Telecommunications System, UMTS for short), and future 5G communications systems.

It should also be understood that in the embodiments of the present invention, a terminal device may be referred to as a terminal (Terminal), user equipment (User Equipment, UE for short), a mobile station (Mobile Station, MS for short), a mobile terminal (Mobile Terminal), or the like. The terminal device may communicate with one or more core networks through a radio access network (Radio Access Network, RAN for short). For example, the terminal device may be a mobile phone (also referred to as a "cellular" phone) or a computer provided with a mobile terminal. For example, the user equipment may also be a portable, pocket-sized, handheld, computer built-in, or in-vehicle mobile apparatus, which exchanges voice and/or data with the radio access network.

Device-to-device (Device to Device, "D2D" for short) communication may be vehicle-to-vehicle (Vehicle to Vehicle, "V2V" for short) communication or V2X communication. In V2X communication, X may generally refer to any device capable of wireless reception and sending, without being limited to a slow-moving wireless apparatus, a fast-moving in-vehicle device, or a network control node capable of wireless transmission and reception. This is not limited in the present invention. It should be understood that the embodiments of the present invention are particularly applicable to a V2X communication scenario, but may still be applied to any other device-to-device communication scenarios. No limitation is imposed in this sense in the embodiments of the present invention.

Figure 1:
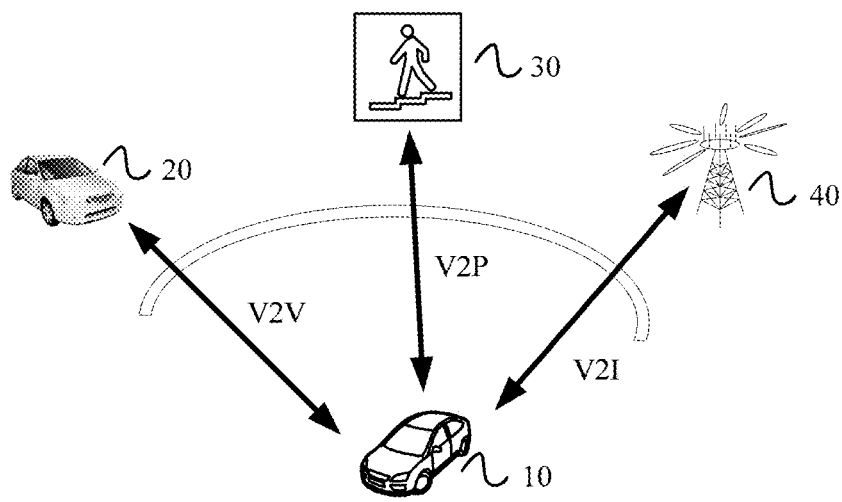
FIG. 1 is a schematic diagram of an application scenario according to an embodiment of the present invention.

FIG. 1 is a schematic diagram of an application scenario according to an embodiment of the present invention. A V2X communication scenario is used as an example for description of FIG. 1. It should be noted that the example in FIG. 1 is intended to help a person skilled in the art to better understand the embodiments of the present invention, but not to limit the scope of the embodiments of the present invention.

Vehicle-to-vehicle (Vehicle to Vehicle, "V2V" for short) communication, vehicle-to-pedestrian (Vehicle to Pedestrian, "V2P" for short) communication, and vehicle-to-infrastructure (Vehicle to Infrastructure, "V2I" for short) communication are collectively referred to as V2X (Vehicle to Everything, "V2X" for short) communication. Main application scenarios of the present invention are D2D scenarios in Rel-12/13 (Release 12/13, "Rel-12/13" for short) of Long Term Evolution-Advanced (Long Term Evolution-Advanced, "LTE-A" for short), and V2X scenarios in Rel-14 (Release 14, "Rel-14" for short) of LTE-A. In FIG. 1, a vehicle 10, a vehicle 20, a pedestrian 30, and an infrastructure 40 all have a D2D capability, and can perform D2D communication with each other. V2V means that communication may be performed between the vehicle 10 and the vehicle 20, V2P means that communication may be performed between the vehicle 10 and the pedestrian 30, and V2I means that communication may be performed between the vehicle 10 and the infrastructure 40. Herein, the vehicle 10 in FIG. 1 may be considered as an in-vehicle device 10 mounted on the vehicle, the vehicle 20 in FIG. 1 may be considered as an in-vehicle device 20 mounted on the vehicle, and the pedestrian 30 in FIG. 1 may be considered as a handheld device 30 carried by the pedestrian 30.

It should be understood that, for ease of description, FIG. 1 shows only communication between individual vehicles, between an individual pedestrian and an individual vehicle, and between an individual vehicle and an individual infrastructure. This is not limited in the present invention. For example, in an Internet of Vehicles system, there may be more vehicles. The present invention is not limited in this sense.

Figure 2:
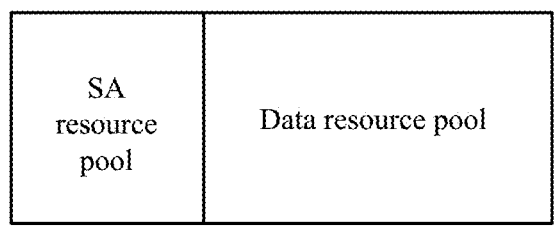
FIG. 2 is a schematic diagram of an SA resource pool and a data resource pool according to an embodiment of the present invention.

In Rel-12 (Release 12, "Rel-14" for short), a resource pool for D2D communication is divided into a scheduling assignment (Scheduling Assignment, "SA" for short) resource pool and a data (Data) resource pool. Resources in the SA resource pool are used to transmit SA data, and resources in the data resource pool are used to transmit traffic data. The SA resource pool and the data resource pool are located in different subframes, and a Time-Division Multiplexing (Time Division Multiplexing, "TDM" for short) manner is used. FIG. 2 is a schematic diagram of an SA resource pool and a data resource pool according to an embodiment of the present invention. The SA resource pool is preceding the related data resource pool in terms of time-domain resources.

During communication, a D2D device may allocate resources in two modes: mode 1 (Mode 1) and mode 2 (Mode 2). In mode 1, resource allocation is performed by using a centralized control method, scheduling is performed on D2D communication resources by a base station or a relay node, and the D2D device directly transmits data and control information on allocated resources. The resource allocation with centralized control is mainly applicable to scenarios with network coverage. Mode 2 is a contention manner based on self-selection by a terminal device. This mode is a distributed resource multiplexing method, where a transmit terminal device obtains a transmit resource from a resource pool through contention. In D2D communication, in a scenario with network coverage, a resource pool is an entire resource block allocated by a base station, and all D2D users contend for a smaller resource block in the entire resource block, so as to transmit data on the resource. In a scenario without network coverage, a resource pool is a predefined system bandwidth obtainable for D2D users, and all D2D users contend for resources in the predefined resources.

Resource allocation technologies for D2D communication may include a random resource selection technology and a resource sensing technology. In one resource sensing (Sensing) technology, energy detection is performed on a resource pool. UE performs energy measurement on each resource element in a resource pool, for example, measuring a reference signal received power (Reference Signal Received Power, "RSRP" for short) or reference signal received quality (Reference Signal Received Quality, "RSRQ" for short). If a measurement result exceeds a threshold, a corresponding resource is considered as having been occupied; if a measurement result does not exceed a threshold, a corresponding resource is considered as an idle resource.

Another resource sensing technology is an SA decoding technology in which a terminal device receives, on an SA resource pool, an SA data packet sent by other UE, and then decodes the received SA data packet. The SA data packet includes information about a corresponding source for sending of the data. That is, related information of a resource occupied by the to-be-sent data in a data resource pool is indicated in the SA data packet. Therefore, by decoding an SA data packet of another terminal device, the terminal device can learn of a resource occupied by the another terminal device in the data resource pool. If the SA data packet is decoded successfully, it is deemed that a corresponding data resource is occupied; if the decoding fails, it is deemed that no resource is occupied in the data resource pool. The terminal device can transmit data only on an unoccupied data resource.

Figure 3:
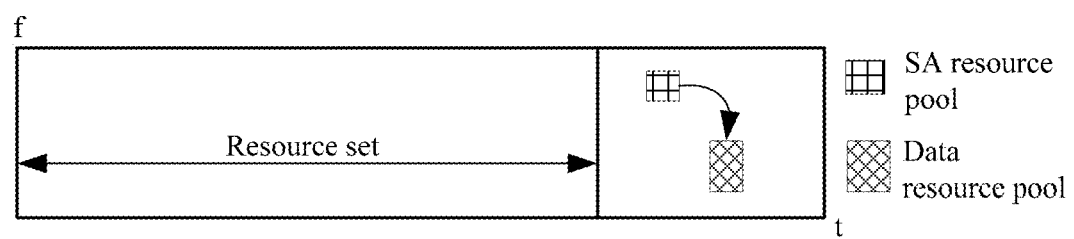
FIG. 3 is a schematic diagram of a resource set used by a terminal device for resource detection according to an embodiment of the present invention.

For current device-to-device communication, in either one of the foregoing resource sensing technologies, a resource set of a fixed size is operated in the resource pool. In some application scenarios, for example, V2X communication, the resource set may also be referred to as a resource set or a sensing window (Sensing Window). FIG. 3 is a schematic diagram of a resource set used by a terminal device for resource sensing. A size of a resource set of each terminal device has fixed duration of time. For example, a resource set is a window with duration of 1 s in time domain. After sensing resources in the resource set, the terminal device selects proper resources to send SA data and traffic data.

If resource sensing is performed in an entire resource set, power consumption of a D2D device, and in particular, a handheld device of a pedestrian in V2P communication, is very high. To resolve a problem in the prior art that power consumption of a D2D device is excessively high in a communication process, in this embodiment of the present invention, the terminal device senses, in some time-frequency resources in the resource set, a transmission resource used for data transmission, so that power consumption of the terminal device is reduced in a D2D communication process.

It should be understood that in some application scenarios, for example, a V2X communication scenario, "detection" in this embodiment of the present invention may also be referred to as "sensing", and a process of resource sensing by the terminal device may be understood as a resource detection process. To be specific, the terminal device performs signal detection in a determined resource set. For example, detection of a transmission resource may be implemented in manners such as decoding a received data packet or performing energy measurement on a received data packet. In some circumstances, the "sensing window" may also be referred to as a "resource set", and the terminal device contends for a transmission resource in the resource set.

Figure 4:
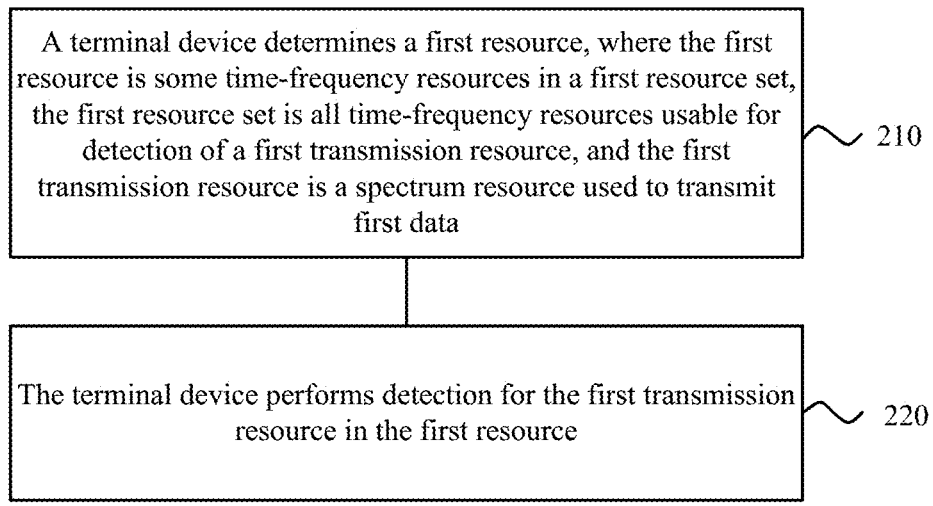
FIG. 4 is a schematic flowchart of a device-to-device communication method according to an embodiment of the present invention.

FIG. 4 is a schematic flowchart of a device-to-device communication method according to an embodiment of the present invention. The method may be performed by a terminal device. As shown in FIG. 4, the communication method includes the following steps:

210. The terminal device determines a first resource, where the first resource is some time-frequency resources in a first resource set, the first resource set is all time-frequency resources that can be used to detect a first transmission resource, and the first transmission resource is a spectrum resource used to transmit first data.

220. The terminal device performs detection for the first transmission resource in the first resource.

In general, after determining the first resource used for detection of the first transmission resource, the terminal device performs detection in the first resource for the first transmission resource used to transmit the data. The first resource includes some of all the time-frequency resources that can be used to detect the first transmission resource, or the first resource is a subset of all the time-frequency resources (that is, the first resource set) that can be used to detect the first transmission resource.

That is, a size of the first resource needs to be less than a size of an original first resource set in the prior art. For example, in the example V2X communication scenario described above, the first resource set may be a time window with duration of is in time domain, as shown in FIG. 3. Therefore, the terminal device does not need to perform detection for the first transmission resource in entire duration of the original resource set, but only needs to perform detection for the first transmission resource in the first resource, that is, the some time-frequency resources in the original first resource set, thereby reducing power consumption to a great extent. As shown in FIG. 3, after completing a detection operation in the resource set, the terminal device may send the first data, for example, SA data or traffic data, on a successfully detected first transmission resource, that is, the frequency-domain resource.

In another embodiment, step 210 of determining a first resource by the terminal device includes: determining, by the terminal device, a target numerical value from a plurality of numerical values, where the target numerical value is used to indicate a time-domain location of the first resource in the first resource set; and determining, by the terminal device, the first resource based on the target numerical value.

Figure 5A:
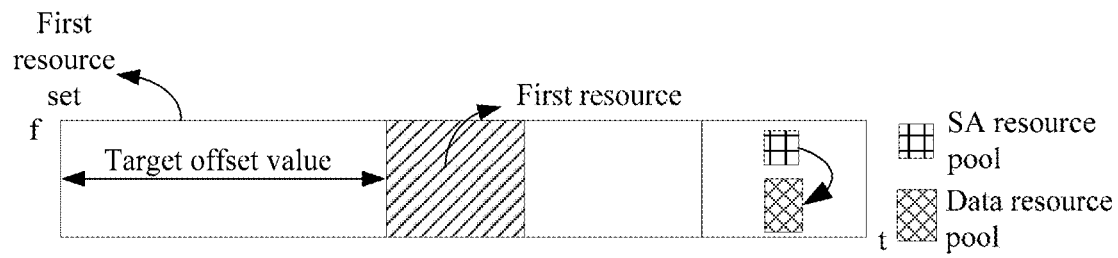
FIG. 5(a) is a schematic diagram of a resource set determining method according to an embodiment of the present invention.

Specifically, FIG. 5(a) is a schematic diagram of a resource set determining method according to an embodiment of the present invention. When determining the first resource, the terminal device may determine one target numerical value from a plurality of numerical values predefined, and then determine a location of the first resource in the first resource set based on a time-domain location indicated by the target numerical value. It should be understood that, in some application scenarios, the numerical value may be referred to as an offset value (offset), representing a time-domain location of the first resource in the first resource set.

These predefined numerical values may be some random "seeds" configured by a network device, and the terminal device performs random selection from these random seeds. Alternatively, for these predefined numerical values, a network device may configure different numerical values for different terminal devices, for example, configuring different numerical values for different types of terminal devices, so that when terminal devices of types such as P-UE and V-UE perform resource detection, the detection operations are kept from being performed in a same time period to reduce resource collision. Alternatively, different types of data correspond to different numerical values. Alternatively, a network device configures different numerical values for terminal devices located in different cells. This is not limited herein.

Optionally, before the terminal device determines the first resource, the method further includes: receiving, by the terminal device, information about the plurality of numerical values that is sent by a network device.

Specifically, the network device may determine, based on information such as a quantity of terminal devices within a coverage area of the network device, coverage statuses of the terminal devices, information about a key frequency band in a carrier, and a type of a currently active service or a type of data being transmitted currently, a plurality of numerical values for selection by the terminal devices; and send information about these numerical values to the terminal devices. For example, the network device sends configuration information including the information about these numerical values in a broadcast manner, or the network device may update configuration information including the information about the plurality of numerical values based on current network usage. It should be understood that the plurality of numerical values may alternatively be a plurality of numerical values agreed upon between the terminal devices and the network device, for example, specified in a protocol.

In another embodiment, step 220 of performing detection for the first transmission resource in the first resource by the terminal device includes: determining, by the terminal device, a target frequency hopping pattern from a plurality of frequency hopping patterns, where the target frequency hopping pattern indicates a time-frequency resource used for a frequency hopping operation; and determining, by the terminal device, the time-frequency resource used for a frequency hopping operation that is indicated by the target frequency hopping pattern, as the first resource.

Specifically, when determining the first resource, the terminal device may select the target frequency hopping pattern from a plurality of frequency hopping patterns predefined. The target frequency hopping pattern indicates a location of the time-frequency resource used for a frequency hopping operation, and the time-frequency resource may include a plurality of unit time-frequency resources. The terminal device performs detection, based on locations of the plurality of unit time-frequency resources indicated by the target frequency hopping pattern, for the first transmission resource used to transmit the first data in the plurality of unit time-frequency resources. The locations of the plurality of unit time-frequency resources may be adjacent, or may not be adjacent. Sizes of all the unit time-frequency resources may be the same, or may be different. No limitation is imposed on a quantity of unit time-frequency resources herein.

Figure 6:
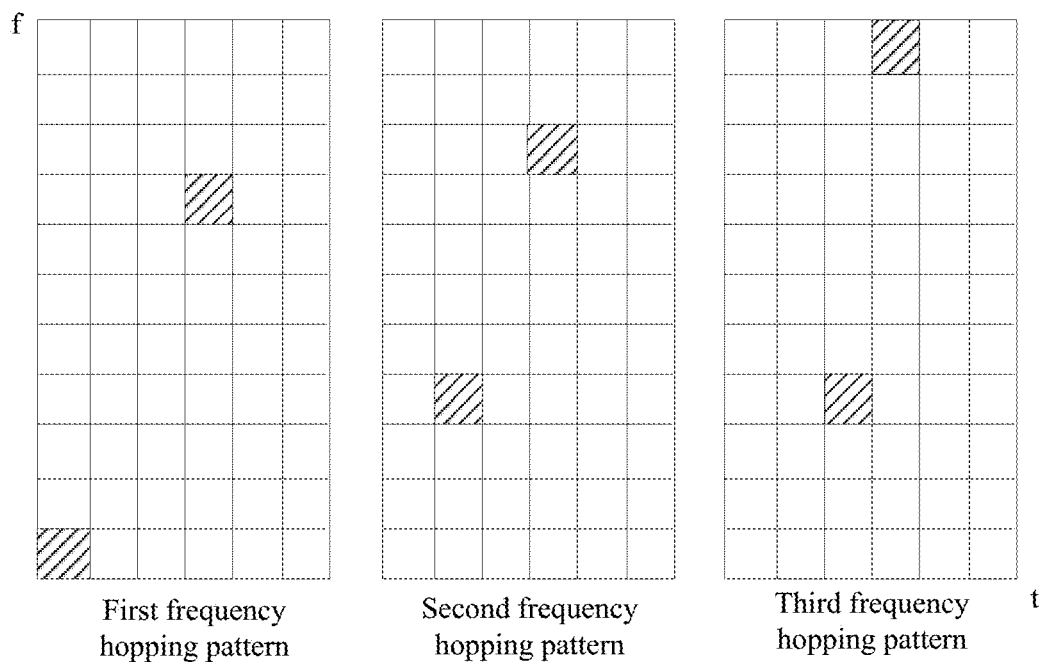
FIG. 6 is a schematic diagram of three frequency hopping patterns according to an embodiment of the present invention.

FIG. 6 is a schematic diagram of three frequency hopping patterns. In a first frequency hopping pattern, a second frequency hopping pattern, and a third frequency hopping pattern, locations of a plurality of unit time-frequency resources (small squares in the figure) used for transmission resource detection that correspond to one frequency hopping pattern differ from those corresponding to another frequency hopping pattern. That is, different frequency hopping patterns correspond to different time-frequency resource areas (first resources) used for detection of the first transmission resource. Therefore, after determining the target frequency hopping pattern, the terminal device can learn in which time-frequency resource areas detection for the first transmission resource is to be performed, so that resource detection is performed based on a frequency hopping pattern with resources of two dimensions, time and frequency.

The terminal device may randomly select one or more frequency hopping patterns as a target frequency hopping pattern from all predefined frequency hopping patterns, and perform resource detection based on the target frequency hopping pattern according to a specified rule or formula. For example, after determining the first resource based on the target frequency hopping pattern, the terminal device may perform resource detection sequentially in a plurality of unit time-frequency resources corresponding to the selected frequency hopping pattern in descending order of frequency values of frequency-domain resources and in ascending order in time domain; or the network device may configure frequency hopping patterns for the terminal device and instruct the terminal device to perform resource detection based on one or more frequency hopping patterns configured.

The plurality of frequency hopping patterns may be frequency hopping patterns in existing D2D communication, or may be frequency hopping patterns of other types newly determined by the network device for detection of a transmission resource, for example, different frequency hopping patterns determined in advance by the network device based on sizes of to-be-transmitted data. This is not limited herein.

It should be understood that the network device may determine, based on information such as a quantity of terminal devices within a coverage area of the network device, coverage statuses of the terminal devices, information about a key frequency band in a carrier, and a type of a currently active service or a type of data being transmitted currently, a plurality of frequency hopping patterns for selection by the terminal devices; and send configuration information including information about these frequency hopping patterns to the terminal devices.

The plurality of frequency hopping patterns may alternatively be a plurality of frequency hopping patterns agreed upon between the terminal device and the network device, for example, specified in a protocol.

In this case, the detecting the first transmission resource in the first resource by the terminal device may include: performing, by the terminal device, detection for the first transmission resource in the first resource based on a frequency hopping parameter of the target frequency hopping pattern. The frequency hopping parameter includes at least one of the following: a time-domain interval between the plurality of unit time-frequency resources, a frequency-domain interval between the plurality of unit time-frequency resources, and a size of each of the plurality of unit time-frequency resources.

Specifically, the time-frequency resource used for a frequency hopping operation that is indicated by the target frequency hopping pattern includes a plurality of unit time-frequency resources. After determining the target frequency hopping pattern, the terminal device can perform detection for the first transmission resource used to transmit the first data, in the plurality of unit time-frequency resources in the first resource based on the frequency hopping parameter of the target frequency hopping pattern, for example, a time-domain interval and a frequency-domain interval between the plurality of unit time-frequency resources and a size of the unit time-domain resource.

In another embodiment, if the terminal device successfully detects the first transmission resource in the first resource, the device-to-device communication method further includes step 230.

230. The terminal device sends the first data on the first transmission resource.

Figure 7:
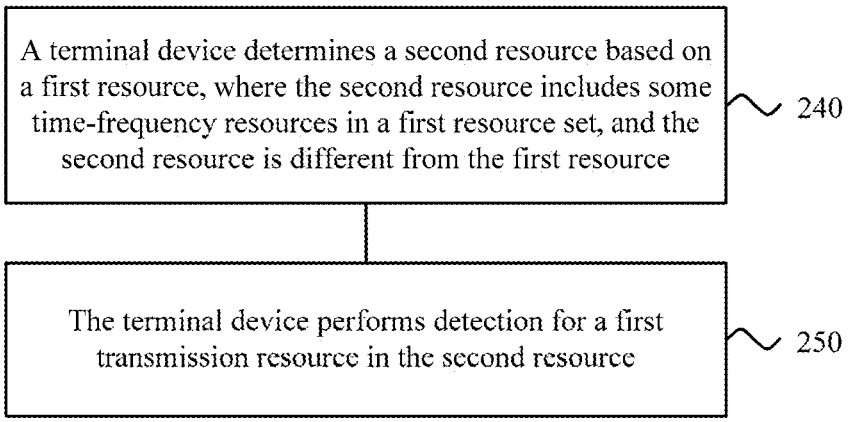
FIG. 7 is a schematic flowchart of a device-to-device communication method according to an embodiment of the present invention.

After determining the first target detection resource, the terminal device performs detection in the first resource for the first transmission resource used to transmit the first data. If the terminal device successfully detects the first transmission resource in the first resource, the terminal device sends the first data on the first transmission resource, that is, performing step 230. If the terminal device fails to detect the first transmission resource in the first resource, as shown in a schematic flowchart of a device-to-device communication method according to an embodiment of the present invention in FIG. 7, the method further includes steps 240 and 250.

240. The terminal device determines a second resource based on the first resource, where the second resource includes some time-frequency resources in the first resource set, and the second resource is different from the first resource.

250. The terminal device performs detection for the first transmission resource in the second resource.

Specifically, if the terminal device fails to detect the first transmission resource in the first resource, the terminal device can continue to perform detection for the transmission resource in another location of the first resource set, for example, performing detection for the first transmission resource in the second resource. The second resource is some time-frequency resources in the first resource set, or the second resource is a subset of all the time-frequency resources (that is, the first resource set) that can be used to detect the first transmission resource. Therefore, after determining the second resource in the first resource set, the terminal device can perform detection in the second resource for the first transmission resource used to transmit the first data.

By analogy, if the terminal device successfully detects the first transmission resource in the second resource, the terminal device transmits the data on the first transmission resource; if the terminal device fails to detect the first transmission resource in the second resource, the terminal device can determine a new resource in the first time window. The new resource is also some time-frequency resources in the first resource set. The terminal device performs detection in the new resource for the first transmission resource used to transmit the first data, until the terminal device successfully detects, in a resource, the first transmission resource used to transmit the first data. If the first transmission resource is still not detected when a quantity of resources used by the terminal device for detection of the first transmission resource in the first resource set reaches a maximum value, the terminal device may stop the resource detection operation.

Some time-frequency resources in the first resource set that are used for one time of detection of the first transmission resource are correlated with those used for another time of detection. Therefore, the terminal device can autonomously perform detection, in the first resource set based on correlation between these time-frequency resources, for the first transmission resource for transmission of the first data, thereby reducing overheads of control signaling between the network device and the terminal device.

In another embodiment, step 240 of determining, by the terminal device, a second resource based on the first resource includes: determining, by the terminal device, a time-domain interval between the second resource and the first resource based on the first resource; and/or determining, by the terminal device, a time-domain resource of the second resource based on the first resource; and/or determining, by the terminal device, a frequency-domain resource of the second resource based on the first resource.

Specifically, a plurality of resources determined by the terminal device in the first resource set that can be used to detect the first transmission resource are correlated. That is, a time-domain size and/or location, and/or a frequency-domain width, and/or the like of each newly determined resource are determined by the terminal device based on related parameters of detection results in all or some preceding resources.

Optionally, the determining, by the terminal device, a time-domain interval between the second resource and the first resource based on the first resource includes:

determining, by the terminal device, the time-domain interval between the second resource and the first resource based on at least one of the following types of information:

an energy value of at least one resource including the first resource, a resource usage of the at least one resource, a congestion or collision level of the at least one resource, and a time-domain interval between the at least one resource.

Figure 8:
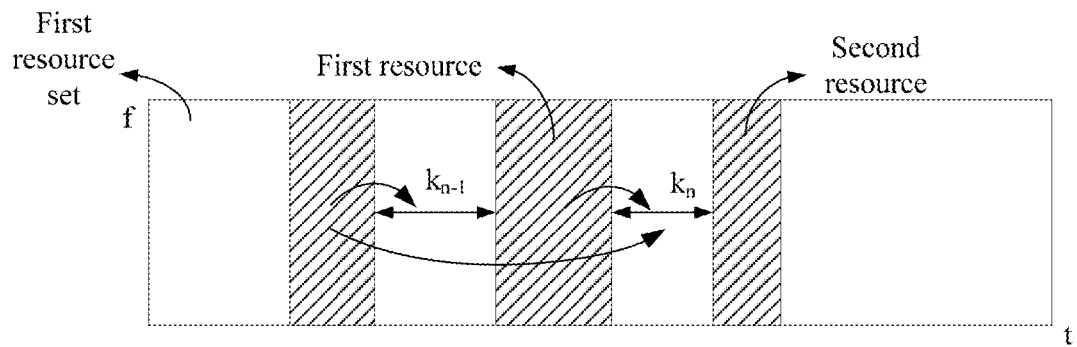
FIG. 8 is a schematic diagram of a resource determining method according to an embodiment of the present invention.

Specifically, if the first resource used to transmit the first data is not detected in the first resource, the terminal device determines the second resource in the first resource set, to perform detection for the first transmission resource in the second resource. In this case, a time-domain interval between the second resource and the first resource in time domain may be determined based on detection results in all or some preceding resources including the first resource. FIG. 8 is a schematic diagram of a resource determining method according to an embodiment of the present invention. The time-domain interval between the second resource and the first resource is $k_n$, and a time-domain interval between the first resource and a resource immediately preceding the first resource is $k_{n-1}$. Then, a value of $k_n$ may be determined by one or more of parameters such as $k_{n-1}$, an energy value p on at least one resource including the first resource, and a resource usage r of the at least one resource including the first resource.

For example, it is assumed that a location of the first resource may be determined herein in the first resource set by using a function $k_n=f(p,r,k_{n-1})$. In resource selection, a role played by the function is reflected in the following way. If a resource usage of an $(n-1)^{th}$ resource, $r_{n-1}$, is very high, for example, exceeding a threshold T, or an energy value, for example, RSRP or RSRQ, detected on the resource is larger, for example, greater than an energy threshold P, a time-domain interval between an $n^{th}$ resource selected by the terminal device and the $(n-1)^{th}$ resource is longer, meaning that a longer period of waiting time is required before selection of a location of the $n^{th}$ resource. In other words, a value of $k_n$ is larger. If a resource usage of an $(n-1)^{th}$ resource, $r_{n-1}$, is within a preset threshold range or an energy value, RSRP or RSRQ, detected on the resource is smaller, for example, less than an energy threshold P, but still no usable resource is found, a time-domain interval between an $n^{th}$ resource selected by the terminal device and the $(n-1)^{th}$ resource is shorter, meaning that only a shorter period of waiting time or no waiting time is required before selection of a location of the $n^{th}$ resource. In other words, a value of $k_n$ is smaller.

By analogy, if a resource usage of an $n^{th}$ resource, $r_n$, is also very high, still exceeding the threshold T, an interval $k_{n+1}$ between locations of the $(n+1)^{th}$ resource and the $n^{th}$ resource is greater than $k_n$; if a resource usage of the $(n+1)^{th}$ resource, $r_{n+1}$, is lower, but still no idle resource is found, a time-domain interval $k_{n+1}$ between the $(n+1)^{th}$ resource and the $n^{th}$ resource that are selected by the terminal device is less than $k_n$.

Optionally, the determining, by the terminal device, a time-domain resource of the second resource based on the first resource includes:

determining, by the terminal device, the time-domain resource of the second resource based on at least one of the following types of information:

an energy value of at least one resource including the first resource, a resource usage of the at least one resource, a congestion or collision level of the at least one resource, and a size of a time-domain resource of the at least one resource.

Figure 9:
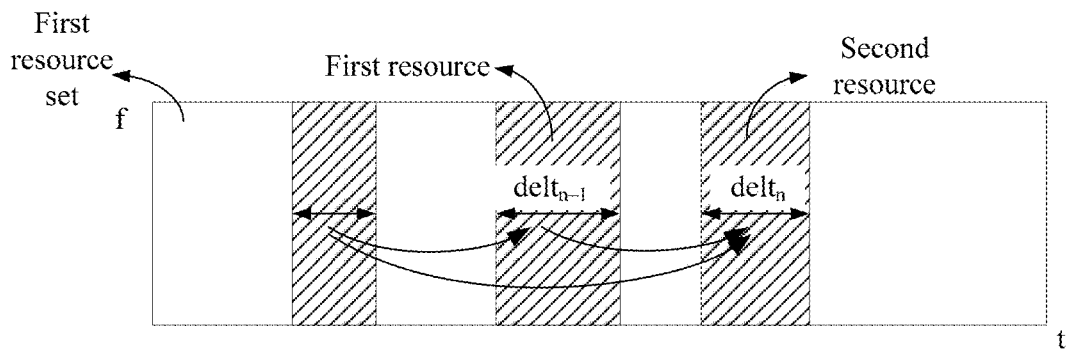
FIG. 9 is a schematic diagram of a resource determining method according to an embodiment of the present invention.

Specifically, if the first transmission resource used to transmit the first data is not detected in the first resource, the terminal device determines the second resource in the first resource set, to perform detection for the first transmission resource in the second resource. In this case, a size of the time-domain resource of the second resource may be determined based on detection results in all or some preceding resources including the first resource. FIG. 9 is a schematic diagram of a resource determining method according to an embodiment of the present invention. A size of the time-domain resource of the second resource is $delt_n$, and a size of a time-domain resource of the first resource is $delt_{n-1}$. Then, a value of $delt_n$ may be determined by one or more of parameters such as $delt_n$, $delt_i$-$delt_n$, which are sizes of time-domain resources of at least one resource including the first resource, an energy value p detected on the at least one resource including the first resource, and a resource usage r of the at least one resource including the first resource.

For example, it is assumed that a resource location may be determined herein in the first resource set by using a function $delt_n=f(p,r,delt_{n-1})$. In resource selection, a role played by the function is reflected in the following way. If a resource usage of an $(n-1)^{th}$ resource, $r_{n-1}$, is very high, for example, exceeding a threshold T, or an energy value, for example, RSRP or RSRQ, detected on the resource is larger, for example, greater than an energy threshold P, a width of a time-domain resource of an $n^{th}$ resource selected by the terminal device, $delt_n$, may be larger, for example, greater than $delt_{n-1}$. If a resource usage of an $(n-1)^{th}$ resource, $r_{n-1}$, is within a preset threshold range or an energy value, for example, RSRP or RSRQ, detected on the resource is smaller, for example, less than an energy threshold P, but still no usable resource is found, a size of a time-domain resource of an $n^{th}$ resource selected by the terminal device, $delt_n$, is smaller, for example, less than $delt_{n-1}$; or a size of an additional time-domain resource in the $n^{th}$ resource is less than an increase magnitude obtained when a resource usage is lower or an energy value on the resource is larger.

By analogy, if a resource usage of the $n^{th}$ resource, $r_n$, is also very high, still exceeding the threshold T, a size of a time-domain resource of an $(n+1)^{th}$ resource, $delt_{n+1}$, is greater than $delt_n$; if a resource usage of the $(n+1)^{th}$ resource, $r_{n+1}$, is lower, but still no idle resource is found, a size of a time-domain resource of an $(n+1)^{th}$ resource selected by the terminal device, $delt_{n+1}$, is less than $delt_n$, or a size of an additional time-domain resource in the $(n+1)^{th}$ resource is less than an increase magnitude obtained when a resource usage is lower or an energy value on the resource is larger.

Optionally, the determining, by the terminal device, a frequency-domain resource of the second resource based on the first resource includes:

determining, by the terminal device, the frequency-domain resource of the second resource based on at least one of the following types of information:

an energy value of at least one resource including the first resource, a resource usage of the at least one resource, a congestion or collision level of the at least one resource, and a size of a frequency-domain resource of the at least one resource.

Figure 10:
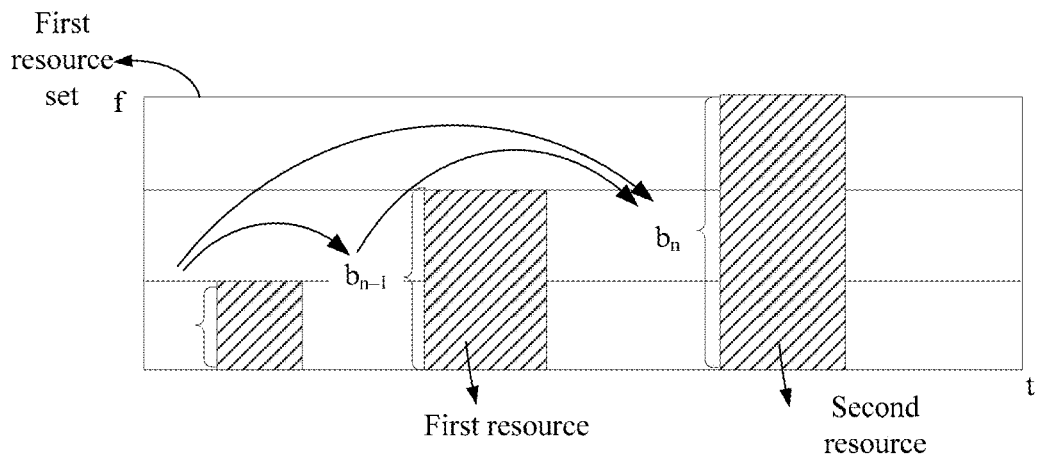
FIG. 10 is a schematic diagram of a resource determining method according to an embodiment of the present invention.

Specifically, if the first resource used to transmit the first data is not detected in the first resource, the terminal device determines the second resource in the first resource set, to perform detection for the first transmission resource in the second resource. In this case, a size of the frequency-domain resource of the second resource may be determined based on detection results in all or some preceding resources including the first resource. FIG. 10 is a schematic diagram of a resource determining method according to an embodiment of the present invention. A size of the frequency-domain resource of the second resource is $b_n$, and a size of a frequency-domain resource of the first resource is $b_{n-1}$. Then, a value of $b_n$ may be determined by one or more of parameters such as $b_n$, $delt_i$-$delt_n$, which are sizes of frequency-domain resources of at least one resource including the first resource, an energy value p detected on the at least one resource including the first resource, and a resource usage r of the at least one resource including the first resource.

For example, it is assumed that a resource location to be selected for use may be determined herein in the first resource set by using a function $b_n=f(p,r,b_{n-1})$. In resource selection, a role played by the function is reflected in the following way. If a resource usage of an $(n-1)^{th}$ resource, $r_{n-1}$, is very high, for example, exceeding a threshold T, or an energy value, for example, RSRP or RSRQ, detected on the resource by the terminal device, is larger, for example, greater than an energy threshold P, a width of a frequency-domain resource of an $n^{th}$ resource selected by the terminal device, $b_n$, may be larger, for example, greater than $b_{n-1}$. If a resource usage of an $(n-1)^{th}$ resource, $r_{n-1}$, is within a preset threshold range or an energy value, for example, RSRP or RSRQ, on the resource is smaller, for example, less than an energy threshold P, but still no usable resource is found, a size of a frequency-domain resource of an $n^{th}$ resource selected by the terminal device, $b_n$, is smaller, for example, less than $b_{n-1}$; or a size of an additional frequency-domain resource in the $n^{th}$ resource is less than an increase magnitude obtained when a resource usage is lower or an energy value on the resource is larger.

By analogy, if a resource usage of an $n^{th}$ resource, $r_n$, is also very high, still exceeding the threshold T, a size of a frequency-domain resource of an $(n+1)^{th}$ resource, $b_{n+1}$, is greater than $b_n$; if a resource usage of the $(n+1)^{th}$ resource, $r_{n+1}$, is lower, but still no idle resource is found, a size of a frequency-domain resource of an $(n+1)^{th}$ resource selected by the terminal device, $b_{n+1}$, is less than $b_n$, or a size of an additional frequency-domain resource in the $(n+1)^{th}$ resource is less than an increase magnitude obtained when a resource usage is lower or an energy value on the resource is larger.

In another embodiment, step S240 of determining, by the terminal device, a second resource based on the first resource includes: determining, by the terminal device, a size of a time-frequency resource of the second resource based on a size of a time-frequency resource of the first resource, where the size of the time-frequency resource of the second resource is greater than or equal to the size of the time-frequency resource of the first resource.

In this embodiment, the terminal device performs detection, in a determined resource by combining random resource selection and selection from some resources in a resource set, for the first transmission resource used to transmit the first data. For example, the terminal device may determine, based on a size of the to-be-sent first data, a smallest resource granularity for resource detection, and then increase, step by step by using the smallest granularity as a unit, a size of a time-frequency resource area used for resource detection.

Figure 11:
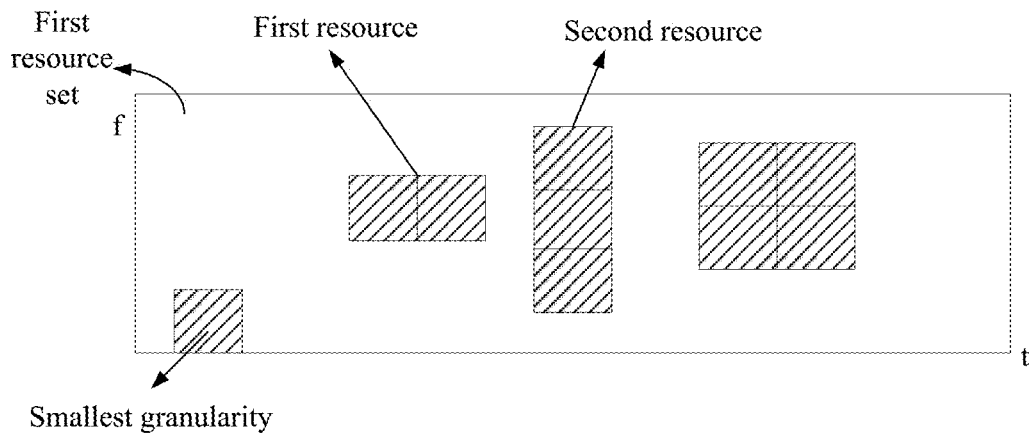
FIG. 11 is a schematic diagram of a resource determining method according to an embodiment of the present invention.

For example, FIG. 11 is a schematic diagram of a resource determining method according to an embodiment of the present invention. The terminal device randomly selects N physical resource blocks (Physical Resource Block, "PRB" for short) in the first resource set as the first resource. A size of the N PRBs is an integer multiple of the smallest granularity. The terminal device performs detection for the first transmission resource in the N PRBs. If the first transmission resource is successfully detected in the N PRBs, the terminal device sends the first data on the first transmission resource. If the terminal device fails to detect the first transmission resource in the N PRBs, the terminal device determines a second resource. In this case, a quantity of PRBs included in time-frequency resources determined in the second resource is greater than or equal to N, for example, N×2 PRBs. A size of the N×2 PRBs is an integer multiple of the smallest granularity and is twice that of the original N PRBs, so as to increase a success rate of resource selection.

By analogy, if the terminal device fails to detect the first transmission resource in the N×2 PRBs, the terminal device determines a new resource in the first resource set for resource detection. A size of the newly determined resource shall be greater than or equal to a size of the second resource. That is, a quantity of PRBs in the new resource is greater than N×2, for example, N×3.

All that have been described are cases in which the terminal device performs source selection by determining a plurality of correlated resources in the current first resource set or randomly selecting a resource from the current first resource set. In an embodiment of the present invention, a result obtained by the terminal device by performing resource detection in some resources in the first resource set may be further used to guide a subsequent process of resource detection in a resource set. The following provides detailed descriptions with reference to FIG. 5 and FIG. 6.

In another embodiment, if the terminal device successfully detects the first transmission resource in the first resource, the method further includes: determining, by the terminal device, a fourth resource based on the first resource, where the fourth resource includes some time-frequency resources in a second resource set, the second resource set is all time-frequency resources that can be used to detect a second transmission resource, the second transmission resource is a spectrum resource used to transmit second data, and a relative location of the fourth resource in the second resource set is the same as a relative location of the first resource in the first resource set; and performing, by the terminal device, detection for the second transmission resource in the fourth resource.

Figure 5B:
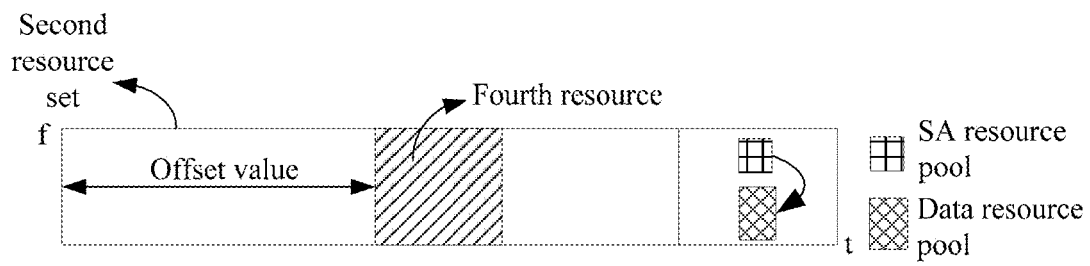
FIG. 5(b) is a schematic diagram of a resource set determining method according to an embodiment of the present invention.

Specifically, after determining the first resource in the first resource set, the terminal device performs detection in the first resource, and determines, based on a detection result, the first transmission resource used to transmit the first data. If the terminal device successfully detects the first transmission resource in the first resource, or the terminal device determines that a resource usage of the first resource is relatively low, when the terminal device still needs to send the second data after sending the first data, the terminal device selects the fourth resource in the second resource set configured for the second data. In this case, the relative location of the fourth resource in the second resource set may be the same as the relative location of the first resource in the first resource set. As shown in FIG. 5(a) and FIG. 5(b), locations of the first resource and the fourth resource in the respective home resource sets are the same. It may also be deemed that a target numerical value (or an offset value) of the first resource is equal to a target numerical value (or an offset value) of the second resource set.

Figure 5C:
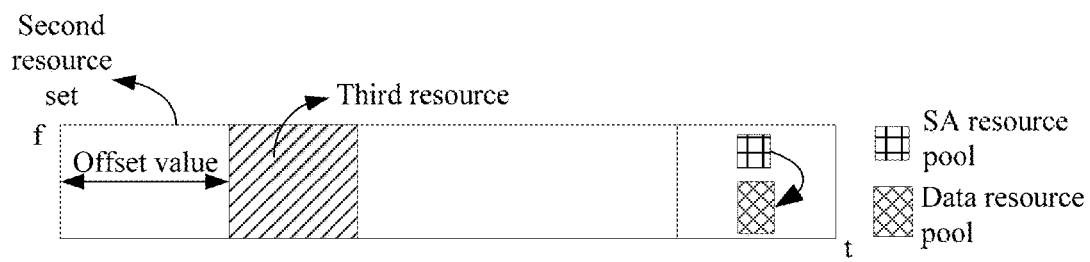
FIG. 5(c) is a schematic diagram of a resource set determining method according to an embodiment of the present invention.

As shown in FIG. 5(a) and FIG. 5(c), if the terminal device fails to detect the first transmission resource in the first resource, or the terminal device determines that a resource usage of the first resource is relatively high, the terminal device determines a third resource in the second resource set. In this case, a new numerical value may be selected from a plurality of numerical values predefined as a target numerical value, and the target numerical value of the third resource is different from the target numerical value of the first resource. In other words, a relative location of the third resource in the second resource set may be different from the relative location of the first resource in the first resource set. This increases a success rate of resource detection.

It should be understood that a size of the third resource may be or not be equal to the size of the first resource. For example, if the terminal device fails to detect the first transmission resource in the first resource or the terminal device determines that a resource usage of the first resource is relatively high, when determining the third resource in the second resource set, the terminal device may make the target numerical value of the third resource equal to the target numerical value of the first resource, or make the size of the third resource greater than the size of the first resource. This is not limited in this embodiment of the present invention.

A detection result obtained for detection of a transmission resource for sending of current data provides guidance for detection of a transmission resource used for sending of subsequent data. Therefore, a success rate of resource contention before subsequent data transmission is increased, and power consumption of the terminal device is reduced further.

For another example, as shown in FIG. 6, if the terminal device successfully detects the first transmission resource in the first resource or the terminal device determines that a resource usage of the first resource is relatively low, when determining the fourth resource in the second resource set, the terminal device may make a relative location of the fourth resource in the second resource set the same as a relative location of the first resource in the first resource set, or the terminal device may select a same frequency hopping pattern for the fourth resource as for the first resource; if the terminal device fails to detect the first transmission resource in the first resource or the terminal device determines that a resource usage of the first resource is relatively low, the terminal device may make a relative location of the third resource in the second resource set different from a relative location of the first resource in the first resource set, or may select, for the third resource, a frequency hopping pattern different from that for the first resource. In this case, locations and distribution of a plurality of time-domain resources used for resource detection that are corresponding to the first resource are different from those of a plurality of time-domain resources used for resource detection that are corresponding to the third resource.

In another embodiment, in the first resource set, if a quantity of resources used by the terminal device for detection of the first transmission resource exceeds a preset value, or a size of a time-domain resource used by the terminal device for detection of the first transmission resource exceeds a preset value, the terminal device stops detection for the first transmission resource in the first resource set.

In this embodiment, the quantity of resources used by the terminal device for detection of the resource in the resource set cannot exceed a maximum value. If the quantity of resources used by the terminal device for detection of the first transmission resource reaches the maximum value, the terminal device ends the detection operation process. Alternatively, a sum of time-domain resources in the resources used by the terminal device for detection in the resource set cannot exceed a maximum threshold. If the size of the time-domain resource used by the terminal device for detection of the first transmission resource exceeds the threshold, the terminal device ends the detection operation process.

In this case, in the first resource set, if the quantity of resources used by the terminal device for detection of the first transmission resource exceeds a preset value, or a size of a time-domain resource used by the terminal device for detection of the first transmission resource exceeds a preset value, the terminal device may perform detection for the first transmission resource in at least the following three manners:

Manner 1: The terminal device determines, from the resources used for detection of the first transmission resource, a spectrum resource whose energy value is less than an energy threshold; and the terminal device determines, from the spectrum resource whose energy value is less than the energy threshold, the first transmission resource used to transmit the first data.

Manner 2: The terminal device determines, from the resources used for detection of the first transmission resource, a spectrum resource having a smallest energy value; and the terminal device determines the spectrum resource having the smallest energy value, as the first transmission resource used to transmit the first data.

Manner 3: The terminal device determines, from the resources used for detection of the first transmission resource, a spectrum resource that is not covered by detection in the first resource set; and the terminal device determines, from the spectrum resource that is not covered by detection, the first transmission resource used to transmit the first data.

Specifically, in the foregoing three implementations, the quantity of resources in the first resource set cannot exceed the maximum value. If the quantity of resources used by the terminal device for detection of the first transmission resource has reached the maximum value but still no usable resource is found, the terminal device ends the detection operation process, and can randomly select, based on a resource detection result, a resource from all resources whose energy values are less than a predefined energy threshold among all resources covered by detection, and send the data.

Alternatively, if the quantity of resources used by the terminal device for detection of the first transmission resource has reached the maximum value but still no usable resource is found, the terminal device may determine, based on a detection result, a time-frequency resource having a smallest energy value among all resources that are covered by detection, and send the data on the time-frequency resource having the smallest energy value.

Alternatively, the terminal device may randomly select, based on a detection result, a resource from resources other than all resources that are covered by detection, and send the data.

In another embodiment, the terminal device may include a handheld terminal device, and when the handheld terminal device and another terminal device that is not the terminal device and that sends non-emergency data detect the first transmission resource simultaneously, a priority of the handheld terminal device is higher than a priority of the another terminal device.

In other words, if the current terminal device is a handheld terminal device, when the terminal device and another terminal device that sends non-emergency data, for example, an in-vehicle device, detect the first transmission resource in a same time-frequency resource simultaneously, the first transmission resource is preempted by the handheld terminal device because a priority of the handheld terminal device is higher than a priority of the in-vehicle terminal device that sends non-emergency data. In this case, the handheld terminal device can send the data on the first transmission resource, thereby reducing power consumption of the handheld terminal device.

In this way, a detection result obtained for detection of a transmission resource for sending of current data provides guidance for detection of a transmission resource used for sending of subsequent data. Therefore, a success rate of resource contention before subsequent data transmission is increased, and power consumption of the terminal device is reduced further.

Therefore, by using the method in the embodiments of the present invention, power consumption of the terminal device can be reduced in a communication process, and resource collision can also be reduced.

It should be understood that, for a process of resource detection by the terminal device in the second resource set for detection of the second transmission resource used to transmit the second data, that is, a process in which the terminal device looks for a transmission resource for current to-be-transmitted data each time when the terminal device attempts to transmit data, refer to the process of determining the first resource in the first resource set by the terminal device. For example, the target numerical value (target offset value) is determined through random selection, or based on indication by the network device, or based on protocol agreement; or a proper target frequency hopping pattern is selected from a plurality of frequency hopping patterns. For brevity, details are not described herein again.

It should also be understood that sequence numbers of the foregoing processes do not mean execution sequences in various embodiments of the present invention, and should not be construed as any limitation on the implementation processes of the embodiments of the present invention. The execution sequences of the processes should be determined depending on functions and internal logic of the processes.

The foregoing has described in detail, with reference to FIG. 1 to FIG. 11, the device-to-device communication method according to the embodiments of the present invention. The following details, with reference to FIG. 12 to FIG. 14, a terminal device according to the embodiments of the present invention. It should be understood that the terminal device in the embodiments of the present invention can perform the methods in the foregoing embodiments of the present invention. For specific working processes of the device, refer to corresponding processes in the foregoing method embodiments.

Figure 12:
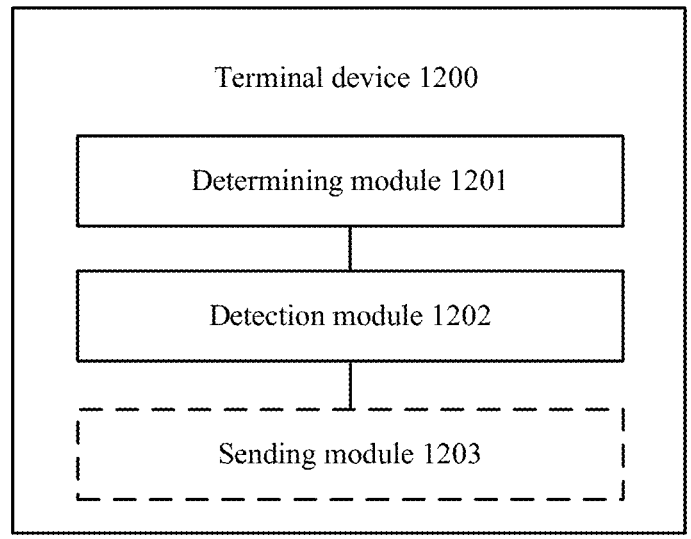
FIG. 12 is a schematic block diagram of a terminal device according to an embodiment of the present invention.

FIG. 12 is a schematic block diagram of a terminal device 1200 according to an embodiment of the present invention. As shown in FIG. 12, the terminal device 1200 includes a determining module 1201, a detection module 1202, and a sending module 1203.

The determining module 1201 is configured to determine a first resource, where the first resource is some time-frequency resources in a first resource set, the first resource set is all time-frequency resources that can be used to detect a first transmission resource, and the first transmission resource is a spectrum resource used to transmit first data.

The detection module 1202 is configured to perform detection for the first transmission resource in the first resource determined by the determining module 1201.

The sending module 1203 is configured to send the first data on the first transmission resource successfully detected by the detection module 1202.

The terminal device in this embodiment of the present invention performs detection, in some time-frequency resources in an original resource set in the prior art, for a transmission resource used for data transmission. Therefore, power consumption of the terminal device is reduced in a device-to-device communication process.

Optionally, the determining module 1201 is specifically configured to: determine a target numerical value from a plurality of numerical values, where the target numerical value is used to indicate a time-domain location of the first resource in the first resource set; and determine the first resource based on the target numerical value.

Optionally, the terminal device 1200 further includes a receiving module 1204, and before the determining module 1201 determines the first resource based on the target numerical value, the receiving module 1204 is configured to receive information about the plurality of numerical values that is sent by a network device.

Optionally, the determining module 1201 is specifically configured to: determine a target frequency hopping pattern from a plurality of frequency hopping patterns, where the target frequency hopping pattern indicates a time-frequency resource used for a frequency hopping operation; and determine the time-frequency resource used for a frequency hopping operation that is indicated by the target frequency hopping pattern, as the first resource.

Optionally, the time-frequency resource used for a frequency hopping operation that is indicated by the target frequency hopping pattern includes a plurality of unit time-frequency resources, and the detection module 1202 is specifically configured to perform detection for the first transmission resource in the first resource based on a frequency hopping parameter of the target frequency hopping pattern. The frequency hopping parameter includes at least one of the following: a time-domain interval between the plurality of unit time-frequency resources, a frequency-domain interval between the plurality of unit time-frequency resources, and a size of each of the plurality of unit time-frequency resources.

Optionally, the terminal device 1200 further includes a receiving module 1204, and before the determining module 1201 determines the target frequency hopping pattern from the plurality of frequency hopping patterns, the receiving module 1204 is configured to receive information about the plurality of frequency hopping patterns that is sent by a network device.

Optionally, if the detection module 1202 successfully detects the first transmission resource in the first resource, the determining module 1201 is further configured to determine a fourth resource based on the first resource, where the fourth resource includes some time-frequency resources in a second resource set, the second resource set is all time-frequency resources that can be used to detect a second transmission resource, the second transmission resource is a spectrum resource used to transmit second data, and a relative location of the fourth resource in the second resource set is the same as a relative location of the first resource in the first resource set; and the detection module 1202 is specifically configured to perform detection for the second transmission resource in the fourth resource.

Optionally, if the detection module 1202 fails to detect the first transmission resource in the first resource, the determining module 1201 is further configured to determine a second resource based on the first resource, where the second resource includes some time-frequency resources in the first resource set, and the second resource is different from the first resource; and the detection module 1202 is specifically configured to perform detection for the first transmission resource in the second resource.

Some time-frequency resources in the first resource set that are used for one time of detection of the first transmission resource are correlated with those used for another time of detection. Therefore, the terminal device can autonomously perform detection, in the first resource set based on correlation between these time-frequency resources, for the first transmission resource for transmission of the first data, thereby reducing overheads of control signaling between the network device and the terminal device.

Optionally, the determining module 1201 is specifically configured to: determine a time-domain interval between the second resource and the first resource based on the first resource; and/or determine a time-domain resource of the second resource based on the first resource; and/or determine a frequency-domain resource of the second resource based on the first resource.

Optionally, the determining module 1201 is specifically configured to determine the time-domain interval between the second resource and the first resource based on at least one of the following types of information: an energy value of at least one resource including the first resource, a resource usage of the at least one resource, a congestion or collision level of the at least one resource, and a time-domain interval between the at least one resource.

Optionally, the determining module 1201 is specifically configured to determine the time-domain resource of the second resource based on at least one of the following types of information: an energy value of at least one resource including the first resource, a resource usage of the at least one resource, a congestion or collision level of the at least one resource, and a size of a time-domain resource of the at least one resource.

Optionally, the determining module 1201 is specifically configured to determine the frequency-domain resource of the second resource based on at least one of the following types of information: an energy value of at least one resource including the first resource, a resource usage of the at least one resource, a congestion or collision level of the at least one resource, and a size of a frequency-domain resource of the at least one resource.

Optionally, the determining module 1201 is specifically configured to determine a size of a time-frequency resource of the second resource based on a size of a time-frequency resource of the first resource, where the size of the time-frequency resource of the second resource is greater than or equal to the size of the time-frequency resource of the first resource.

Optionally, the determining module 1201 is further configured to determine a third resource based on the first resource, where the third resource includes some time-frequency resources in a second resource set, the second resource set is all time-frequency resources that can be used to detect a second transmission resource, the second transmission resource is a spectrum resource used to transmit second data, and a relative location of the third resource in the second resource set is different from a relative location of the first resource in the first resource set; and the detection module 1202 is specifically configured to perform detection for the second transmission resource in the third resource.

A detection result obtained for detection of a transmission resource for sending of current data provides guidance for detection of a transmission resource used for sending of subsequent data. Therefore, a success rate of resource contention before subsequent data transmission is increased, and power consumption of the terminal device is reduced further.

Optionally, in the first resource set, if a quantity of resources used by the terminal device 1200 for detection of the first transmission resource exceeds a preset value, or a size of a time-domain resource used by the terminal device 1200 for detection of the first transmission resource exceeds a preset value, the terminal device 1200 stops detection for the first transmission resource in the first resource set.

Optionally, the determining module 1201 is further configured to: determine, from the resources used for detection of the first transmission resource, a spectrum resource whose energy value is less than an energy threshold; and determine, from the spectrum resource whose energy value is less than the energy threshold, the first transmission resource used to transmit the first data.

Optionally, the determining module 1201 is further configured to: determine, from the resources used for detection of the first transmission resource, a spectrum resource having a smallest energy value; and determine the spectrum resource having the smallest energy value as the first transmission resource used to transmit the first data.

Optionally, the determining module 1201 is further configured to: determine, based on the resources used for detection of the first transmission resource, a spectrum resource that is in the first resource set and that is not covered by detection; and determine, from the spectrum resource that is not covered by detection, the first transmission resource used to transmit the first data.

Optionally, the terminal device 1200 includes a handheld terminal device, and when the handheld terminal device 1200 and another terminal device that is not the terminal device and that sends non-emergency data detect the first transmission resource simultaneously, a priority of the handheld terminal device 1200 is higher than a priority of the another terminal device.

Figure 13:
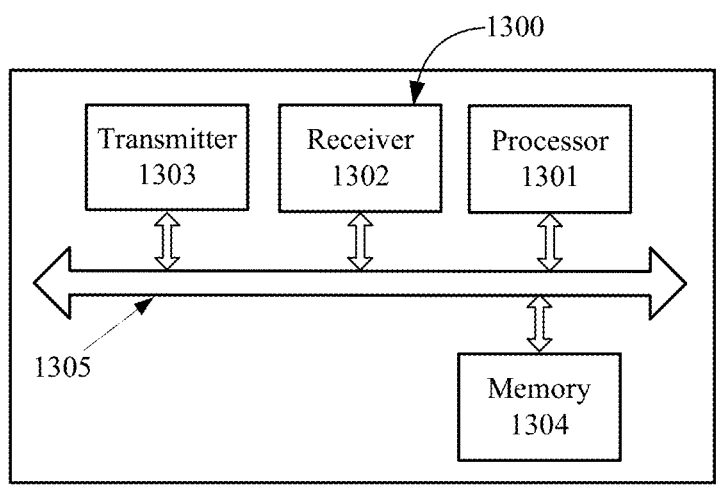
FIG. 13 is a schematic block diagram of a terminal device according to an embodiment of the present invention.

It should be noted that in this embodiment of the present invention, the determining module 1201 and the detection module 1202 may be implemented by a processor, the sending module 1203 may be implemented by a transmitter, and the receiving module may be implemented by a receiver. As shown in FIG. 13, the terminal device 1300 may include a processor 1301, a receiver 1302, a transmitter 1303, and a memory 1304. The receiver 1302 and the transmitter 1303 may be collectively referred to as a transceiver. The memory 1304 may be configured to store an instruction, and may be further configured to store, for example, code for execution by the processor 1301. The components of the terminal device 1300 are coupled together by using a bus system 1305. In addition to a data bus, the bus system 1305 further includes a power bus, a control bus, and a status signal bus. The processor 1301 is specifically configured to:

determine a first resource, where the first resource is some time-frequency resources in a first resource set, the first resource set is all time-frequency resources that can be used to detect a first transmission resource, and the first transmission resource is a spectrum resource used to transmit first data; and perform detection for the first transmission resource in the first resource.

The transmitter 1303 is configured to send the first data on the first transmission resource successfully detected by the processor 1301.

The terminal device in this embodiment of the present invention performs detection, in some time-frequency resources in an original resource set in the prior art, for a transmission resource used for data transmission. Therefore, power consumption of the terminal device is reduced in a device-to-device communication process.

Optionally, the processor 1301 is specifically configured to: determine a target numerical value from a plurality of numerical values, where the target numerical value is used to indicate a time-domain location of the first resource in the first resource set; and determine the first resource based on the target numerical value.

Optionally, before the processor 1301 determines the first resource based on the target numerical value, the receiver 1302 is configured to receive information about the plurality of numerical values that is sent by a network device.

Optionally, the processor 1301 is specifically configured to: determine a target frequency hopping pattern from a plurality of frequency hopping patterns, where the target frequency hopping pattern indicates a time-frequency resource used for a frequency hopping operation; and determine the time-frequency resource used for a frequency hopping operation that is indicated by the target frequency hopping pattern, as the first resource.

Optionally, the time-frequency resource used for a frequency hopping operation that is indicated by the target frequency hopping pattern includes a plurality of unit time-frequency resources, and the processor 1301 is specifically configured to perform detection for the first transmission resource in the first resource based on a frequency hopping parameter of the target frequency hopping pattern. The frequency hopping parameter includes at least one of the following: a time-domain interval between the plurality of unit time-frequency resources, a frequency-domain interval between the plurality of unit time-frequency resources, and a size of each of the plurality of unit time-frequency resources.

Optionally, before the processor 1301 determines the target frequency hopping pattern from the plurality of frequency hopping patterns, the receiver 1302 is configured to receive information about the plurality of frequency hopping patterns that is sent by a network device.

Optionally, if the processor 1301 successfully detects the first transmission resource in the first resource, the processor 1301 is further configured to determine a fourth resource based on the first resource, where the fourth resource includes some time-frequency resources in a second resource set, the second resource set is all time-frequency resources that can be used to detect a second transmission resource, the second transmission resource is a spectrum resource used to transmit second data, and a relative location of the fourth resource in the second resource set is the same as a relative location of the first resource in the first resource set; and the processor 1301 is specifically configured to perform detection for the second transmission resource in the fourth resource.

Optionally, if the processor 1301 fails to detect the first transmission resource in the first resource, the processor 1301 is further configured to determine a second resource based on the first resource, where the second resource includes some time-frequency resources in the first resource set, and the second resource is different from the first resource; and the processor 1301 is specifically configured to perform detection for the first transmission resource in the second resource.

Some time-frequency resources in the first resource set that are used for one time of detection of the first transmission resource are correlated with those used for another time of detection. Therefore, the terminal device can autonomously perform detection, in the first resource set based on correlation between these time-frequency resources, for the first transmission resource for transmission of the first data, thereby reducing overheads of control signaling between the network device and the terminal device.

Optionally, the processor 1301 is specifically configured to: determine a time-domain interval between the second resource and the first resource based on the first resource; and/or determine a time-domain resource of the second resource based on the first resource; and/or determine a frequency-domain resource of the second resource based on the first resource.

Optionally, the processor 1301 is specifically configured to determine the time-domain interval between the second resource and the first resource based on at least one of the following types of information: an energy value of at least one resource including the first resource, a resource usage of the at least one resource, a congestion or collision level of the at least one resource, and a time-domain interval between the at least one resource.

Optionally, the processor 1301 is specifically configured to determine the time-domain resource of the second resource based on at least one of the following types of information: an energy value of at least one resource including the first resource, a resource usage of the at least one resource, a congestion or collision level of the at least one resource, and a size of a time-domain resource of the at least one resource.

Optionally, the processor 1301 is specifically configured to determine the frequency-domain resource of the second resource based on at least one of the following types of information: an energy value of at least one resource including the first resource, a resource usage of the at least one resource, a congestion or collision level of the at least one resource, and a size of a frequency-domain resource of the at least one resource.

Optionally, the processor 1301 is specifically configured to determine a size of a time-frequency resource of the second resource based on a size of a time-frequency resource of the first resource, where the size of the time-frequency resource of the second resource is greater than or equal to the size of the time-frequency resource of the first resource.

Optionally, if the processor 1301 fails to detect the first transmission resource in the first resource, the processor 1301 is further configured to determine a third resource based on the first resource, where the third resource includes some time-frequency resources in a second resource set, the second resource set is all time-frequency resources that can be used to detect a second transmission resource, the second transmission resource is a spectrum resource used to transmit second data, and a relative location of the third resource in the second resource set is different from a relative location of the first resource in the first resource set; and the processor 1301 is specifically configured to perform detection for the second transmission resource in the third resource.

A detection result obtained for detection of a transmission resource for sending of current data provides guidance for detection of a transmission resource used for sending of subsequent data. Therefore, a success rate of resource contention before subsequent data transmission is increased, and power consumption of the terminal device is reduced further.

Optionally, in the first resource set, if a quantity of resources used by the terminal device 1300 for detection of the first transmission resource exceeds a preset value, or a size of a time-domain resource used by the terminal device 1300 for detection of the first transmission resource exceeds a preset value, the terminal device 1300 stops detection for the first transmission resource in the first resource set.

Optionally, the processor 1301 is further configured to: determine, from the resources used for detection of the first transmission resource, a spectrum resource whose energy value is less than an energy threshold; and determine, from the spectrum resource whose energy value is less than the energy threshold, the first transmission resource used to transmit the first data.

Optionally, the processor 1301 is further configured to: determine, from the resources used for detection of the first transmission resource, a spectrum resource having a smallest energy value; and determine the spectrum resource having the smallest energy value as the first transmission resource used to transmit the first data.

Optionally, the processor 1301 is further configured to: determine, based on the resources used for detection of the first transmission resource, a spectrum resource that is in the first resource set and that is not covered by detection; and determine, from the spectrum resource that is not covered by detection, the first transmission resource used to transmit the first data.

Optionally, the terminal device 1300 includes a handheld terminal device 1300, and when the handheld terminal device 1300 and another terminal device that is not the terminal device and that sends non-emergency data detect the first transmission resource simultaneously, a priority of the handheld terminal device 1300 is higher than a priority of the another terminal device.

Figure 14:
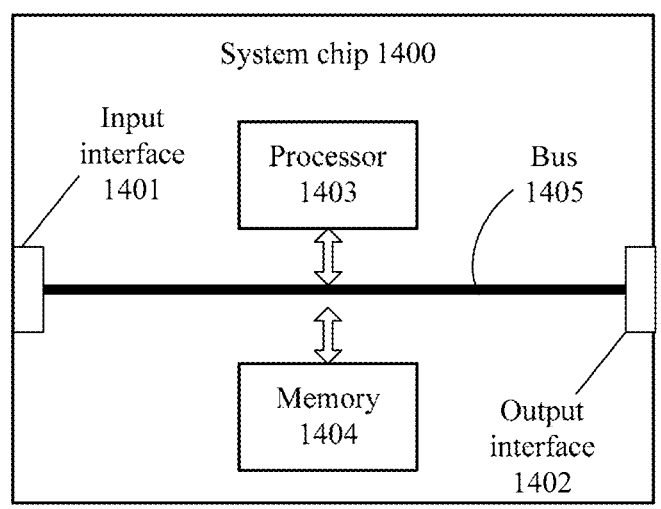
FIG. 14 is a schematic structural diagram of a system chip according to an embodiment of the present invention.

FIG. 14 is a schematic structural diagram of a system chip according to an embodiment of the present invention. The system chip 1400 in FIG. 14 includes an input interface 1401, an output interface 1402, at least one processor 1403, and a memory 1404. The input interface 1401, the output interface 1402, the processor 1403, and the memory 1404 are connected by using a bus 1405, the processor 1403 is configured to execute code in the memory 1404, and when the code is executed, the processor 1403 implements the method performed by the terminal device in FIG. 4 to FIG. 11.

It can be understood that the processor in this embodiment of the present invention may be an integrated circuit chip and has a signal processing capability. In an implementation process, steps in the foregoing method embodiments can be implemented by using a hardware integrated logic circuit in the processor, or by using software-form instructions. The processor may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor may implement or perform the methods, the steps, and logical block diagrams that are disclosed in the embodiments of the present invention. The general-purpose processor may be a microprocessor, or the processor may be any conventional processor or the like. Steps of the methods disclosed with reference to the embodiments of the present invention may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in the embodiments of the present invention may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory of the system and method described in this specification includes but is not limited to these and memories of any other appropriate types.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined based on A. However, it should also be understood that determining A based on B does not mean that B is determined based on A only, but B may be determined based on A and/or other information.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use a different method to implement the described functions for each particular application, but it should not be considered that the implementation goes beyond the scope of the present invention.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses, or units, and may be in electrical, mechanical, or other forms.

The units described as separate parts may or may not be physically separate. Parts displayed as units may or may not be physical units, and may be located in one place or distributed on a plurality of network units. Some or all of the units may be selected depending on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A device-to-device communication method, wherein the method comprises:
   determining, by a terminal device, a first resource, wherein the first resource is a first subset of time-frequency resources in a first resource set, wherein a size of the first resource is less than a size of the first resource set, wherein the first resource set is all time-frequency resources that can be used to detect a first transmission resource, wherein the first transmission resource is a spectrum resource used to transmit first data, and wherein determining the first resource comprises:
      receiving, by the terminal device, information about a plurality of numerical values that is sent by a network device;
      determining, by the terminal device, a target numerical value based on indication by the network device, wherein the target numerical value is used to indicate a time-domain location of the first resource in the first resource set;
      determining, by the terminal device, the first resource based on the target numerical value; and
   performing, by the terminal device, detection for the first transmission resource in the first resource.

2. The method according to claim 1, wherein the determining, by a terminal device, a first resource comprises:
   determining, by the terminal device, a target frequency hopping pattern from a plurality of frequency hopping patterns, wherein the target frequency hopping pattern indicates a time-frequency resource used for a frequency hopping operation; and
   determining, by the terminal device and as the first resource, the time-frequency resource used for a frequency hopping operation that is indicated by the target frequency hopping pattern.

3. The method according to claim 2, wherein the time-frequency resource used for a frequency hopping operation that is indicated by the target frequency hopping pattern comprises a plurality of unit time-frequency resources; and
   wherein the performing, by the terminal device, detection for the first transmission resource in the first resource comprises performing, by the terminal device, detection for the first transmission resource in the first resource based on a frequency hopping parameter of the target frequency hopping pattern, wherein the frequency hopping parameter comprises at least one of the following:
      a time-domain interval between the plurality of unit time-frequency resources;
      a frequency-domain interval between the plurality of unit time-frequency resources; or
      a size of each of the plurality of unit time-frequency resources.

4. The method according to claim 2, wherein before the determining, by the terminal device, a target frequency hopping pattern from a plurality of frequency hopping patterns, the method further comprises:
   receiving, by the terminal device, information about the plurality of frequency hopping patterns that is sent by the network device.

5. The method according to claim 1, wherein if the terminal device fails to detect the first transmission resource in the first resource, the method further comprises:
   determining, by the terminal device, a second resource based on the first resource, wherein the second resource comprises a second subset of time-frequency resources in the first resource set, wherein the second resource is different from the first resource; and
   performing, by the terminal device, detection for the first transmission resource in the second resource.

6. The method according to claim 5, wherein the determining, by the terminal device, a second resource based on the first resource comprises at least one of:
   determining, by the terminal device, a time-domain interval between the second resource and the first resource based on the first resource;
   determining, by the terminal device, a time-domain resource of the second resource based on the first resource; or
   determining, by the terminal device, a frequency-domain resource of the second resource based on the first resource.

7. The method according to claim 6, wherein the determining, by the terminal device, a time-domain interval between the second resource and the first resource based on the first resource comprises:
   determining, by the terminal device, the time-domain interval between the second resource and the first resource based on at least one of the following types of information:
      an energy value of at least one resource comprising the first resource;
      a resource usage of the at least one resource;
      a congestion or collision level of the at least one resource; or
      a time-domain interval between the at least one resource.

8. The method according to claim 6, wherein the determining, by the terminal device, a time-domain resource of the second resource based on the first resource comprises:
   determining, by the terminal device, the time-domain resource of the second resource based on at least one of the following types of information:

an energy value of at least one resource comprising the first resource;

a resource usage of the at least one resource;

a congestion or collision level of the at least one resource; or a size of a time-domain resource of the at least one resource.

9. An apparatus, comprising:

a memory comprising instructions;

a receiver, the receiver is configured to receive information about a plurality of numerical values that is sent by a network device; and at least one processor in communications with the memory, wherein the at least one processor is configured to execute the instructions to:

determine a first resource, wherein the first resource is a first subset of time-frequency resources in a first resource set, wherein a size of the first resource is less than a size of the first resource set, wherein the first resource set is all time-frequency resources that can be used to detect a first transmission resource, wherein the first transmission resource is a spectrum resource used to transmit first data, wherein determining the first resource comprises:

determining a target numerical value based on indication by the network device, wherein the target numerical value is used to indicate a time-domain location of the first resource in the first resource set; and determining the first resource based on the target numerical value; and perform detection for the first transmission resource in the first resource.

10. The apparatus according to claim 9, wherein the at least one processor is configured to:

determine a target frequency hopping pattern from a plurality of frequency hopping patterns, wherein the target frequency hopping pattern indicates a time-frequency resource used for a frequency hopping operation; and determine, as the first resource, the time-frequency resource used for a frequency hopping operation that is indicated by the target frequency hopping pattern.

11. The apparatus according to claim 10, wherein the time-frequency resource used for a frequency hopping operation that is indicated by the target frequency hopping pattern comprises a plurality of unit time-frequency resources; and wherein the at least one processor is configured to:

perform detection for the first transmission resource in the first resource based on a frequency hopping parameter of the target frequency hopping pattern, wherein the frequency hopping parameter comprises at least one of the following:

a time-domain interval between the plurality of unit time-frequency resources;

a frequency-domain interval between the plurality of unit time-frequency resources; or a size of each of the plurality of unit time-frequency resources.

12. The apparatus according to claim 10, wherein before the processor determines the target frequency hopping pattern from the plurality of frequency hopping patterns, the receiver is configured to:

receive information about the plurality of frequency hopping patterns that is sent by the network device.

13. The apparatus according to claim 9, wherein if the at least one processor fails to detect the first transmission resource in the first resource, the at least one processor is further configured to:

determine a second resource based on the first resource, wherein the second resource comprises a second subset of time-frequency resources in the first resource set, and wherein the second resource is different from the first resource; and perform detection for the first transmission resource in the second resource.

14. The apparatus according to claim 13, wherein the at least one processor is configured to perform at least one of the following:

determine a time-domain interval between the second resource and the first resource based on the first resource;

determine a time-domain resource of the second resource based on the first resource; or determine a frequency-domain resource of the second resource based on the first resource.

15. The apparatus according to claim 14, wherein the at least one processor is configured to:

determine the time-domain interval between the second resource and the first resource based on at least one of the following types of information:

an energy value of at least one resource comprising the first resource;

a resource usage of the at least one resource;

a congestion or collision level of the at least one resource; or a time-domain interval between the at least one resource.

16. The apparatus according to claim 14, wherein the at least one processor is configured to:

determine the time-domain resource of the second resource based on at least one of the following types of information:

an energy value of at least one resource comprising the first resource;

a resource usage of the at least one resource;

a congestion or collision level of the at least one resource; or a size of a time-domain resource of the at least one resource.

* * * * *